US011457356B2

(12) United States Patent
Rao et al.

(10) Patent No.: US 11,457,356 B2
(45) Date of Patent: Sep. 27, 2022

(54) GESTURES INCLUDING MOTIONS PERFORMED IN THE AIR TO CONTROL A MOBILE DEVICE

(71) Applicants: Sanjay K Rao, Palo Alto, CA (US); Sunil K Rao, Palo Alto, CA (US); Rekha K Rao, Palo Alto, CA (US)

(72) Inventors: Sanjay K Rao, Palo Alto, CA (US); Sunil K Rao, Palo Alto, CA (US); Rekha K Rao, Palo Alto, CA (US)

( * ) Notice: Subject to any disclaimer, the term of this patent is extended or adjusted under 35 U.S.C. 154(b) by 459 days.

(21) Appl. No.: 15/049,117

(22) Filed: Feb. 21, 2016

(65) Prior Publication Data

US 2016/0188205 A1     Jun. 30, 2016

Related U.S. Application Data

(63) Continuation of application No. 13/804,942, filed on Mar. 14, 2013, now Pat. No. 9,300,645.

(51) Int. Cl.
    *H04W 12/06*      (2021.01)
    *H04L 9/40*      (2022.01)
    *H04M 1/72466*      (2021.01)
    *G06F 3/01*      (2006.01)
    (Continued)

(52) U.S. Cl.
CPC ............ *H04W 12/06* (2013.01); *G06F 3/017* (2013.01); *G06F 3/04886* (2013.01); *H04L 63/08* (2013.01); *H04L 63/105* (2013.01); *H04M 1/72466* (2021.01); *H04M 2201/42* (2013.01);
(Continued)

(58) Field of Classification Search
CPC .... G06F 3/0488; G06F 3/04886; G06F 3/017; G06F 3/048; G06F 3/0235; G06F 3/02; H04L 63/08; H04L 63/105; H04L 63/0861; H04M 1/7258; H04M 1/72466; H04W 12/06; H04W 36/22
See application file for complete search history.

(56) References Cited

U.S. PATENT DOCUMENTS 5,252,951 A * 10/1993 Tannenbaum .......... G06F 3/023
                                                                                                  345/156
6,130,665 A * 10/2000 Ericsson ............. G06F 3/04886
                                                                                                  178/18.01
(Continued)

OTHER PUBLICATIONS

Xiaojun Bi et al., Bimanual Gesture Keyboard, ACM, 2012.*
Jaime Ruiz et al., User-Defined Motion Gestures for Mobile Interaction, ACM (Year: 2011).*

*Primary Examiner* — Shanto Abedin

(57) ABSTRACT

A cellular telephone or mobile device with several methods of touch, voice, and gesture based input is described. A user is able to interact with a touch screen display on the device to select one or more keys, expand keys, and customize legends or toolbars. A user may deliver spoken audio to the device and actuate a series of commands on the device including search on the device, search on the Internet, accessing an Internet resource, or downloading a document. A user may be able to execute one or more macros on the device. The device may further have a plurality of authentication methods based on the activities on the device. Authentication requests may be made for specific applications or the device. An authentication request may include identifying pictures taken on the device and engaging in activities with the photos.

15 Claims, 7 Drawing Sheets

(51) Int. Cl.
*G06F 3/04886* (2022.01)
*H04W 12/68* (2021.01)

(52) U.S. Cl.
CPC ........ *H04M 2250/22* (2013.01); *H04W 12/68* (2021.01)

(56) References Cited

U.S. PATENT DOCUMENTS

| | | | | |
|---|---|---|---|---|
| 6,882,859 B1* | 4/2005 | Rao | ......................... | H04L 63/12 455/550.1 |
| 7,129,927 B2* | 10/2006 | Mattsson | ................ | G06F 3/017 345/158 |
| 7,365,736 B2* | 4/2008 | Marvit | .................. | G06F 1/1613 345/156 |
| 7,844,914 B2* | 11/2010 | Andre | ................. | G06F 3/04186 715/773 |
| 8,059,101 B2* | 11/2011 | Westerman | ......... | G06F 3/04883 345/173 |
| 8,625,796 B1* | 1/2014 | Ben Ayed | ........... | H04L 63/0853 380/258 |
| 8,819,812 B1* | 8/2014 | Weber | .................... | G06F 3/017 726/19 |
| 9,021,379 B1* | 4/2015 | Patel | .................. | G06F 3/04886 715/773 |
| 9,058,103 B2* | 6/2015 | St. Clair | ............... | G06F 3/0489 |
| 9,207,852 B1* | 12/2015 | Zhou | .................... | G06F 3/0425 |
| 9,652,145 B2* | 5/2017 | Cho | .................... | G06F 3/0488 |
| 10,365,819 B2* | 7/2019 | Migos | ................. | G06F 3/04886 |
| 2005/0212751 A1* | 9/2005 | Marvit | .................. | G06F 1/1613 345/156 |
| 2008/0259039 A1* | 10/2008 | Kocienda | ............ | G06F 3/04886 345/173 |
| 2009/0128504 A1* | 5/2009 | Smith | .................. | G06F 3/0488 345/173 |
| 2010/0073329 A1* | 3/2010 | Raman | ................... | G06F 3/167 345/177 |
| 2010/0103106 A1* | 4/2010 | Chui | ..................... | G09B 21/00 345/166 |
| 2010/0251124 A1* | 9/2010 | Geppert | .................. | H04W 4/21 715/734 |
| 2011/0059777 A1* | 3/2011 | Rao | ........................ | G06F 1/1647 455/566 |
| 2011/0209102 A1* | 8/2011 | Hinckley | .............. | G06F 3/0483 715/863 |
| 2011/0244924 A1* | 10/2011 | Jung | ..................... | G06F 3/0481 455/566 |
| 2012/0017147 A1* | 1/2012 | Mark | .................... | G06F 1/1639 715/702 |
| 2012/0117501 A1* | 5/2012 | Koch | .................. | G06F 3/04886 345/173 |
| 2012/0146903 A1* | 6/2012 | Arihara | ................... | G06F 3/011 345/158 |
| 2012/0245941 A1* | 9/2012 | Cheyer | ................... | G06F 21/32 704/246 |
| 2012/0306740 A1* | 12/2012 | Hoda | ................... | G06F 3/0304 345/156 |
| 2012/0326961 A1* | 12/2012 | Bromer | .................. | G06F 3/044 345/156 |
| 2013/0002562 A1* | 1/2013 | Leskela | ............... | G06F 3/04886 345/169 |
| 2013/0120271 A1* | 5/2013 | Lee | ....................... | G06F 3/0482 345/168 |
| 2013/0132856 A1* | 5/2013 | Binyamin | ............... | G06F 3/017 715/740 |
| 2013/0301830 A1* | 11/2013 | Bar-El | ................ | H04L 63/0823 380/210 |
| 2013/0326583 A1* | 12/2013 | Freihold | ............ | G06F 3/04815 726/3 |
| 2014/0078063 A1* | 3/2014 | Bathiche | ................ | G06F 3/0235 345/168 |
| 2014/0149754 A1* | 5/2014 | Silva | ..................... | G06F 1/3212 713/300 |
| 2014/0168071 A1* | 6/2014 | Ahmed | .............. | H04N 5/23206 345/156 |
| 2014/0250402 A1* | 9/2014 | Van Eaton | ............ | G06F 3/0482 715/773 |

\* cited by examiner

GESTURES INCLUDING MOTIONS PERFORMED IN THE AIR TO CONTROL A MOBILE DEVICE

CROSS-REFERENCE TO RELATED APPLICATIONS

The present application is a continuation of U.S. patent application Ser. No. 13/804,942, filed on Mar. 14, 2013, entitled Mobile IO Input and Output for Smartphones, Tablet, and Wireless Devices Including Touch Screen, Voice, Pen, and Gestures. The disclosure of U.S. patent application Ser. No. 13/804,942 is herein incorporated by reference in its entirety.

BACKGROUND OF THE INVENTION

The input and output (I/O) methods for electronic devices are limited and may be difficult to use on tablet computers, smartphones, cellular telephones and various mobile devices. Effective input and output methods are relevant for authentication, command, and control functions of the device. Keyboards, keypads, and other touch based input and output methods on a cellular telephone or mobile device (CT/MD) may be difficult to actuate due to the size of a key and the size of a person's finger or pen-based stylus. Entry on such a device may result in the incorrect key selected due to a misalignment between the user's finger or pen and the screen. The present disclosure relates to mobile devices including cellular telephones, smart phones, tablet computers, hybrid tablet and smart phones, wireless devices, or handheld computing devices. The devices may include a plurality of radios for wireless local area network and wide area network communication including WiFi, 802.11 (any variant), Bluetooth, NFC, or other communication means.

Further, individuals using CT/MDs may find themselves in situations where it is difficult to devote their full attention to interacting with the CT/MD. The lack of attention to the operations on the CT/MD may further result in difficulty with input and output and incorrect operations. A lack of attention may lead to inadvertent dialing on a cell phone. Alternatively, when too much attention is dedicated to a task such as authentication it may become cumbersome, monotonous, and repetitive. Therefore, a diversity of authentication methods is needed for greater security and engagement.

SUMMARY OF THE INVENTION

It is an aspect of the present disclosure to enable more efficient and rich input and output on smartphones, cellular telephones, tablet computers, and various mobile devices. The CT/MD may include the functions of a PDA. The device may use a plurality of functions on the device including an image camera, front facing camera, back facing camera, video camera, eye tracking software, microphone, and fingerprint reader. The device may be capable of multimedia play including video, music, games, voice recording, video recording, still picture capture, streaming music, streaming video, spreadsheet applications, note taking, banking applications, and other productivity tools.

It is yet another aspect of the disclosure for the device to be configured with a touch sensitive display. The touch sensitive display may be comprised of layers of sensors and protective glass, protective plastic, LCD, Super LCD, OLED, AMOLED, Super AMOLED, Backlit LED, color filters, polarizers, active matrix systems, in plane switching, or TFT. The touch screen display may be configured with a setting that adjusts the sensitivity of the display and turns on multi-touch.

It is an aspect of the present disclosure to enable real time photo and video acquisition and real time sharing of the photos and videos with a server for processing, storage, and sharing to other CT/MDs, servers or cloud. The pictures and videos may be edited and processed on the CT/MD or server. The CT/MD or server may recognize the photos, crop the images, filter the images, enhance lighting, or perform other actions.

Predictive Text System:

It is an aspect of the present disclosure to enable an input and output (I/O) system beyond simple predictive text entry systems to include person, context, application in use, dialect, prior words entered, or historical word patterns associated with a user to auto-correct, suggest, or select certain letters. The system may also analyze spoken voice from a user based on similar factors to appropriately convert audio to text and suggest words or sentences. The device may download a thesaurus or dictionary or query a dictionary or thesaurus located on a server in delayed or real time as a user is typing on the CT/MD to provide suggestions to the user. The device may query a server in real time to display thesaurus related output as a user types.

The server may collect and use the responses and corrections from a plurality of users and devices to improve the predictive text system. The predictive text system may connect to a crowd-sourced predictive text database that may be localized for certain regions or countries. The database may map incorrect spellings to suggested words to accepted or used words. The database may score the number of times that an incorrect word is mapped to the suggested and accepted words to refine the database. As an example, the server may store in memory the recommendation of a suggested word to a user on a CT/MD. If the user in turn chooses not to change the word, the server may mark this entry as not having been suggested and not changed. If a user chooses to change the response, the server records the suggested word or words and the ultimate word entered. The server may record the time, location, entire sentence, paragraph, or words immediately preceding and after the operative word in the predictive text system. The server may record the specific name and contact information in a document, email, or text message to determine a mapping between a suggested word and the contact. As an example, an individual may use colloquial language with close contacts but more formal language with coworkers. The predictive text system may create a specific data file for contacts classified in various categories and suggest the appropriate words based on these categories.

It is an aspect of the present disclosure to allow an individual to use an input and output method that includes predefined sentences and phrases to allow for easy composition of messages. The device may also display by default a keyboard specific to the contact. When composing a message to a contact who uses English to communicate may bring up by default an English keyboard. A contact who uses Japanese to communicate may bring up a Japanese keyboard by default. A single CT/MD may dynamically switch between displaying these keyboards based on the current contact being viewed. These keyboards may further include pre-defined, frequently used phrases, or statements customized specifically for the contact, time of day, and location. For example if a given contact is a parent, the keyboard or area above the keyboard may display phrases such as "I will be home in 30 minutes." This area may suggest a variety of words, phrases, partial sentences, full sentences or paragraphs. These suggestions may be learned automatically by for example a machine learning system based on phrases from the specific user in their discussions with the user they are presently dialoging with or from all users they dialog. Language preferences for each individual may be based on the country code or area code in a phone number, stated preferences of the individual, or a database stored on the CT/MD or server.

Gestures and Touch for UI Control and Authentication:

It is an aspect of the present disclosure to enable the touch based system to be fully configurable by a user, administrator, or server device. For example, a left swipe motion of a hand on the screen may be configured to shift a window off the screen to the left. A right hand motion may be configured to snap a window to a predefined portion of the right screen. Other shapes can be configured by the user using a macro system. The CT/MD may present a shape drawing window. In the shape drawing window, a user may perform a gesture either by making contact with the display of the device or by performing a motion in the air as it is recorded by the camera on the CT/MD or other device. This gesture may then be saved in the memory of the device or on a server. The user may link the gesture to a set of macro commands or instructions.

For example, if a user drew a circle as a gesture, then user could link a circle to the movement of a current window to the background and a background window to the center foreground. Each window could be assigned a position in this roundtable like format. Repeatedly drawing a circle can move through the set of windows in a clockwise or counter clockwise fashion based on the direction of the gesture recorded. Alternatively performing a simple rotation with a hand may in turn advance the next window in the roundtable format.

A user may create a triangle shape. As an example, a triangle shape could then be linked to displaying three windows, where a first window occupies the top half of the screen, a second window occupies a bottom corner of the screen, and a third window occupies the bottom right portion of the screen.

A user may want four or six windows to appear at the same time on CT/MD screen. In this case, the user may draw a square with four boxes or six boxes. A user may also use two hands to align the windows. For example, three fingers pushed in the left direction may set up three windows on the screen. This action followed by three fingers being moved across the screen in the opposite direction may open three additional windows below the initial three windows. This may create a display with 6 windows. A user may further want to close a window. A window may be closed by drawing an X on the touch screen display. Other combinations of vibration of the device, single taps, double taps, or holding of taps may be used. These gestures may be further linked to macros which access servers to carry through a series of functions. For example, a diamond shape may be recorded by a user and linked to saving the current document, checking for new email, querying a news information item or initiating a phone call to a predetermined contact or emergency number.

Authentication, Prevention of Inadvertent Dialing and Privacy Controls:

It is another aspect of the disclosure to require authentication to the device using an interaction experience between a user and the touch sensitive display. The authentication may require a user to engage in a number of handwriting activities. The user may handwrite a name, object, symbol or reference on the display. The user may actuate contact with the display through a touch of a finger, pen, or other input method. The user may trace an object outline to identify a pattern. A handwriting sample from the user may be stored on the device or on an external device or a server. A handwriting authentication request may be stored on a server and downloaded by the CT/MD on a periodic basis. The authentication request may consist of a variety of puzzles, handwriting tasks or answers that a user may need to complete to gain access to the CT/MD.

The authentication request may require an individual to use handwriting or drawing to fill in shapes or pictures or trace images. The drawing may be done by using a finger against the touch screen or a pen input device. The pen input device may be housed within the CT/MD.

It is another aspect of the disclosure for a user or administrator to develop a series of authentication activities. A user may create multiple authentication responses, store these responses on the device or a server. These authentication responses may be stored in a look up table. The device may be configured to present a multiple steps to the authentication.

It is another aspect of the disclosure for the user to respond to an authentication request that uses pictures, videos, or other content on the device to access the device. A user may be requested to identify the people in an image stored on the device. A user may be requested to be identify a location including geography that an image taken by a camera on the device. The image may include location data identify the latitude and longitude, city, location, date or time of the image capture.

It is yet another aspect of the system provide for multimodal or multidevice authentication in which a user must execute a series of authentication steps across applications, devices, or locations. The authentication request can be required to access the CT/MD, configuration settings of the CT/MD, applications on the device, or the settings of a remote system. As an example, a user may need to authenticate on a plurality of devices in order to access an application on the first CT/MD.

It is yet another aspect of the disclosure to use data from one application on the device in conjunction with data from another application on the device or on another service or device. An authentication service could use the transaction or history data from a music application, browsing application, email applications, phone call application, photo application, video camera device, location, or GPS history.

It is yet another aspect of the disclosure to allow for a series of icons to be displayed on a screen of the CT/MD prior to the user gaining full access the CT/MD such that a user may only authenticate to an application and note the device. A user may then select an icon to actuate an application or macro. The actuation of the icon can subsequently request a user to authenticate to the device. A user may then be authenticated to a sole application or macro function on the device instead of authentication to all the applications on the device. A server may manage which applications a user can access, which applications require a specific authentication method, and which applications a user can install, execute, or delete. The server may further configure, install, delete or execute applications or data on the device. The server may associate the device, including the device's unique id, with information specific to that user, a set of permissions associated with that user, a list of applications associated with the user or device in conjunction with a policy and provisioning system.

It is an aspect of the disclosure to allow for a user to authenticate to the device by selecting a list of contacts that were previously called. The device would present a list to a user of potential contacts called and the user may be required to select which contact was actually called.

It is an aspect of the present disclosure to prevent users from inadvertently making phone calls prior to a call. A user may be required to confirm their phone call after placing the call. This may require a user to see a second message dialog box to confirm the call.

It is yet another aspect of the disclosure to allow for a system of preventing inadvertent phone calls, email messaging, or other application use during an active call.

It is an aspect of the present disclosure to enable a screen to be locked upon a call being initiated if a specific configuration setting is enabled. The phone may lock the screen to disable touch input to the display in response to movement of the phone. The movement of the phone may be acquired using an accelerometer located in the device. The device may use user interaction to determine when to lock the screen or temporarily disable touch based contact. A user that initiates a call may then move the phone to the ear. The device may first determine that a call has been moved. The device may then detect movement for a duration or period of time post call initiation. Upon the receiving party accepting the call, the device may then lock the screen or temporarily disable touch based input. The device may also secure the screen from other activities or disable touch based input based on an ambient light sensor. When the available light detected by the ambient light sensor is low, for example, when the device is held next to the cheek of a person's face, the device may disable the touch screen or automatically secure the screen. The device may also be configured by a server or by the individual with the time or events that lead to the screen being locked. A user may physically shake the device to call someone, physically shake the device to terminate a call, or physically shake the device to lock the screen.

It is yet another aspect of the disclosure to prompt a user of a potential inadvertent phone call by detecting the behavior of the user. In one example, if a phone call has been in session for an extended period of time and there has been no spoken words received by the microphone on the device, the device may detect a likely event of an inadvertent phone call. The device may then signal a warning that an inadvertent phone call has occurred by making a sound, a beep, or terminating the call. The device may use noise cancellation and noise identification to determine whether spoken audio or general background noise was determined. If only background noise is detected and no spoken audio, the system may conclude that the call is an inadvertent call, notify the user, and terminate the call.

By linking the drawing of a shape on the screen to a predefined action, the user may circumvent prying eyes from awareness of the activities of the primary user on the device. A witness to the CT/MD may not understand what actions a given gesture may be linked to. As an example, an individual that is in an emergency may not have the ability to call '911' or another public authority. The user could draw a star shape on the screen and a telephone call, text message, or email message to a public number, emergency contact, or family member may be initiated automatically with a predefined method. This call may further have the speaker turned off while the microphone continues to record.

It is an aspect of the present disclosure to enable the gestures to be configured to only execute when a specific finger is used. A specific finger or fingers may be configured for the gestures. Many individuals may use their index finger for touch based activities. In order to prevent incorrect usage of the finger, a different finger such as a ring finger or pinky finger could be used. The CT/MD or server could identify the specific finger by the size of actuated area on the touch screen display, by a fingerprint reader, by a camera which may record the user performing the action.

It is an aspect of the present disclosure to enable the CT/MD to be preconfigured with various shapes as described above or the CT/MD may download gestures from a server, or application store/exchange, which may accept suggested gestures from a community of participants.

It is an aspect of the present disclosure to enable the CT/MD to be configured for an obfuscated displayed. Individuals using mobile devices may need a private display which prevents other individuals from viewing the current screen of the device. This scenario may occur in a variety of places including trains, planes, and automobiles where an individual may sit in close proximity to another individual. In this scenario, the CT/MD may display multiple windows simultaneously where a first window may display a first set of text and a second window may display a second set of text. A user may compose a message, which displays in a third window of the device. The text may be associated to add to the text in either the first or second window. However, in this privacy mode, the screen may not redraw the text onto the screen. This can prevent other individuals from reading the full document while it is being typed. Instead individuals may only see the text being currently written upon in the third window but not the entire document at the same time.

It is an aspect of the present disclosure to have one or more full or partial virtual keyboards, keypads, or input mechanism displayed on a touch sensitive display on the device. These keyboards may be split across the screen of device and appear in multiple locations simultaneously.

Notifications:

It is an aspect of the present disclosure to enable the device to be connected to a server or Internet device to download rules, protocols, keys, icons, menus, toolbars, legends, and data about the icons and menus. Menus and other UI items for a specific device may stored as a configuration setting on a server. A user may configure the locations, size groupings, width between the icons displayed, icon picture, and menu colors. The server may record these configuration settings to enable multiple CT/MDs to automatically have the same settings. The device may communicate with the server to download and update configuration settings. The server may control the configuration settings, locations of icons, menus, and other user interface items on the device. The server may mirror the configuration settings and user interface items across multiple devices. The device may be identified by a unique device ID which may be associated with configuration, security, and application management policies.

It is an aspect of the CT/MD to provide a notification service to the device. The CT/MD may download updates including information messages, meta data, application data, rules, and other items from a server. The CT/MD may be configured to frequently poll a server for the information. The Server may automatically send this information to the CT/MD. The notification information may include new emails that may have arrived, text messages, application relevant notifications, or operating system (OS) notifications such as OS updates. The icons may be modified by a server including appending a number next to the icon, changing the image of an icon, changing the color of an icon, or making the icon blink. Similar modifications may be enabled for other UI components based on notification information.

It is yet another aspect to enable to the CT/MD to download from the server a new menu, icon, or update all notifications upon entering a specific location as determined by GPS, WiFi access point, or other location method. Alternatively, a server may send information to the device to update the display of an icon including a numeric indicator next to an icon.

Movable UI, Keyboards and Windows on Mobile Devices:

The CT/MD may download a keyboard or keypad from a server. The device may be configured with a set of popular keyboards by default. The keyboards may be enabled in one or more languages. The keyboard may be enabled with one or more symbols or emoticons. The keyboard may be configured for input to a specific appliance. As an example, for a CT/MD to interact with a television may require a separate keyboard which includes up/down channel indicators, volume indicators, numeric entry for a channel, or a PIP capability. An intelligent appliance such as a microwave may require a keyboard which accepts input of time of cooking, power setting or type of food.

It is an aspect of the present disclosure to allow for the device to play a sound in response to a key being depressed. Alternatively, the device may vibrate in response to a key being depressed. A user may desire a key to be read aloud as it is depressed. A key may also be highlighted in an increased font size or window size as it is depressed.

It is yet another aspect of the present disclosure to have an on-screen or virtual key may further be mapped to communicate automatically with a separate device. As an example, a key on the right side of the CT/MD may correspond to changing the channel on a intelligent television. A key on the left side of the device may correspond to turning on or off a DVR system.

It is an aspect of the present disclosure to have a physical key mapped to more than one function on the device. A physical key on the device may be reprogrammed by an individual on the device or by a setting on a server. A physical key on the device may be configured by an application stored in the memory of the device. A physical key may correspondingly be enabled with a plurality of functions based on the application or context. The context may be include the lighting in the room, temperature, the applications running on the mobile device, the location of the CT/MD as determined by Global Positioning Service (GPS), Wi-Fi, 802.11a,b,c, n (or any variant), Bluetooth, or other protocol, or proximity to other mobile devices. A server or a user on the device may control the assignment of a physical key to a specific action, set of actions, or applications. A physical key may further be mapped to communicate automatically with a separate device. As an example, a key on the right side of the CT/MD may correspond to changing the channel on a intelligent television. A key in another location may correspond to changing the volume on an intelligent television. A key on the left side of the device may correspond to turning on or off an Internet enabled music device.

In another embodiment of the present disclosure, the keyboard may be displayed in a fixed or movable area on the device. The keyboard may be confined to a specific window. A user may drag and drop a keyboard around the device to place it a desired location. Alternatively, a user may drag specific keys or macros to be placed in certain locations on the screen. An 'enter' key which be frequently used may be placed on the right side of the device. Alternatively, the 'enter' key could be mapped to a specific gesture such as a down arrow on the a specified side of the screen. Alternatively, text may further be moved around the screen of the device. These items may then be placed to always appear in a particular region such as the top right, bottom right, or other area of the screen.

It is an aspect of the present disclosure to display the keyboard in one or multiple areas of the CT/MD simultaneously. The keyboard may be configured to be a fixed location on the CT/MD. It is further an option for the keyboard to be configured in a variable position on the CT/MD. It is an aspect of the present disclosure to enable the keyboard to be in a floating position on the CT/MD. A user may drag the keyboard from a bottom area of the device to the top of the device such that keys are located on the top of the device and the other viewable content is shown below the top of the keyboard.

It is an aspect of the disclosure to enable a full or partial keyboard to be associated with the right or left side of the device. A numeric keypad may appear on the right side of the display and the content may appear to the left side of the display. Alternatively, the numeric keys may be split in various sides and corners of the device while the text keypad is situated in the center of the screen.

It is an aspect of the present disclosure to allow for physical vibration of the device in response to a key, icon, menu, legend or other item being selected on the CT/MD. A vibration of the device may provide an output mechanism important to individuals that are distracted. A sound may be played or a letter may be spoken after a key is depressed. A letter 'e' may be spoken aloud by the device. A full sentence may also be spoken by the device. This may aid in input and output for visually impaired.

Voice to Text, Dictation, and Server Updates

It is an aspect of the present disclosure to allow the user to dictate a message to the CT/MD and display the content of the dictation on the screen on the CT/MD. The local device or a server may perform the speech to text conversion. The server may stream the results in near real time as the conversion is being taken place or send a set of converted data after a certain time period or amount of content. As an example, a server may send an entire converted paragraph of spoken audio into text in order to reduce the overhead of the packet message being sent. The server could send the data in real time which may increase the overhead of the messaging but improve the speed with which the results are delivered. These preferences may be configured on the CT/MD or on the server.

It is an aspect of the present disclosure to allow processing of voice to text to occur on the CT/MD or a server. The server may deliver the text in an encrypted format back to the device. The server may improve its voice to text translation based on the spoken patterns specific to a person, classification of a person based on demographic information such as age, or based on other users of the system.

It is an aspect of the disclosure to have the dictated message stored on a remote server.

It is an aspect of the present disclosure to provide information boxes, windows, or dialog messages to enable enhanced operating system to user interaction, software application to user interaction, remote device to user interaction, and server to user interaction. This interaction may enable a user to be prompted with a message box on the CT/MD to confirm actions based on data from a remote server, Internet server, or network device. These message boxes may be controlled by the server, configured in response to server messages, or defined by a software program on the device.

It is an aspect of the present disclosure to allow for an icon to be configured as a macro or be configured to execute a series of functions. The icon may be structured as a shortcut to perform several functions in sequence, simultaneously, or delayed. An icon can be configured to call a person, launch an application, launch a function within an application, execute a series of commands in one application, execute a series of commands in multiple applications, query an Internet resource, complete a series of Internet actions including performing a search and classifying a response.

The macro keys may be defined by the user by selecting a series of operations to allow. For example, a user may create a macro to send a message to a contact using all available communication methods including email, SMS, and voicemail. The macro keys may allow for data to be shared from one application to the next application. A photo in one application may be automatically sent to a photo imaging program for processing and refinement and then returned to the photo application. The server may also prevent certain macros or sequences of commands from taking place on the device. The device, for example, may be prevented of sharing data from one application to another application or to a specific server. The macros may be executed in response to a touch or voice or audio input.

It is yet another aspect of the disclosure to enable multiple inputs including touch by a finger, pen or stylus or audible input including spoken commands, voice, sound simultaneously. As an example, the CT/MD may be configured for full multitasking across applications and I/O systems.

It is an aspect of the present disclosure to allow for the actuation of one icon to create a connection with a remote server. As an example, a single icon or button can execute a series of actions to update the content, applications, media, preferences and settings on the CT/MD with a server or servers. This icon may provide a simple method for synchronization across several applications.

In yet another aspect of the disclosure, a user may be prompted with a dialog box or message window to confirm whether the user would like to carry through with the call. This second confirmation may reduce inadvertent calling. This requirement may be for specific contacts in the CT/MD address book.

It is yet another aspect of the disclosure the device may be configured with compressed or expanded keys, keyboards, menus, buttons, icons, or other graphical user interface items. A given key may be expanded when it is initially pressed or while it is being depressed. Alternatively the items may be expanded or compressed based on the orientation including portrait, landscape, or inverted of the device. The size may also be configured by the individual as a preference, a device preference or by a server preference.

It is another aspect of the disclosure for the device to change functions based on available battery life on the device. As an example, the device may turn off or reduce the quality of all video applications when the battery reached below a certain threshold. The device may reduce the fidelity of the images displayed including the brightness and updates to pixels based on the battery life.

It is yet another aspect of the device to enable the keyboards, menus, legends, and icons to be updated dynamically by a server or in response to data from a server. As an example, the keyboard may be updated when a new device is discovered by the CT/MD.

It is yet another aspect of the disclosure for the device to change the primary keyboards, keypads, legends or menu items in response to a touch based input. As an example, a user may execute a series of steps to split the screen on the CT/MD and simultaneously make available a legend, keyboard, and text document view.

It is an aspect of the disclosure for the device to show the desktop of the device by a user tapping a predefined area of the CT/MD. It is an aspect of the CT/MD to display half a screen of the desktop in response to a user actuating a part of the display. Alternatively, touching an icon or menu bar may also result in showing the desktop of the CT/MD.

It is another aspect of the present disclosure to display a new keypad, legend or area based on the application that is running in the foreground of the CT/MD. As an example, a software application that relates to telephony by default shows a numeric keypad while an application focused on message composition by default shows a standard keyboard.

It is yet another aspect of the disclosure to allow for a toolbar, navigation bar, or legend bar to be fully configurable. The toolbar, navigation bar, or legend bar may be configured to include other icons, shortcuts, or macros. A user may configure which icons to place in the toolbar, navigation bar, or legend by moving an icon from one display area to the toolbar, navigation bar, or legend. A user may add icons to a toolbar located on the bottom of the device. A user may scan across items in the menu while the menu is in a fixed area of the display. The area outside of the menu bar may stay constant. The menu may contain a series of keyboards, icons, phrases, words, or other items.

It is yet another aspect of the disclosure to provide an overlay image on top of other images on the device for authentication purposes. The authentication method may be associated with a sequence of sounds. A keyboard may be displayed which may be associated with a musical instrument keyboard. For example, a keyboard may include the keys of a violin, piano, or other musical instrument. The sequence of notes played may also provide an authentication method to access an application, such as a music player, or the device. The use of authentication methods tied to the nature of the application may make the authentication request and process more relevant to the user.

Other aspects, features and advantages of the present disclosure will become apparent from the following detailed description when taken in conjunction with the accompanying drawings.

BRIEF DESCRIPTION OF THE SEVERAL VIEWS OF THE DRAWING

The accompanying drawings, being incorporated in and forming a part of this specification, illustrate embodiments of the disclosure and, together with the description, serve to explain the principles of the present disclosure.

DETAILED DESCRIPTION OF THE INVENTION

Figure 1:
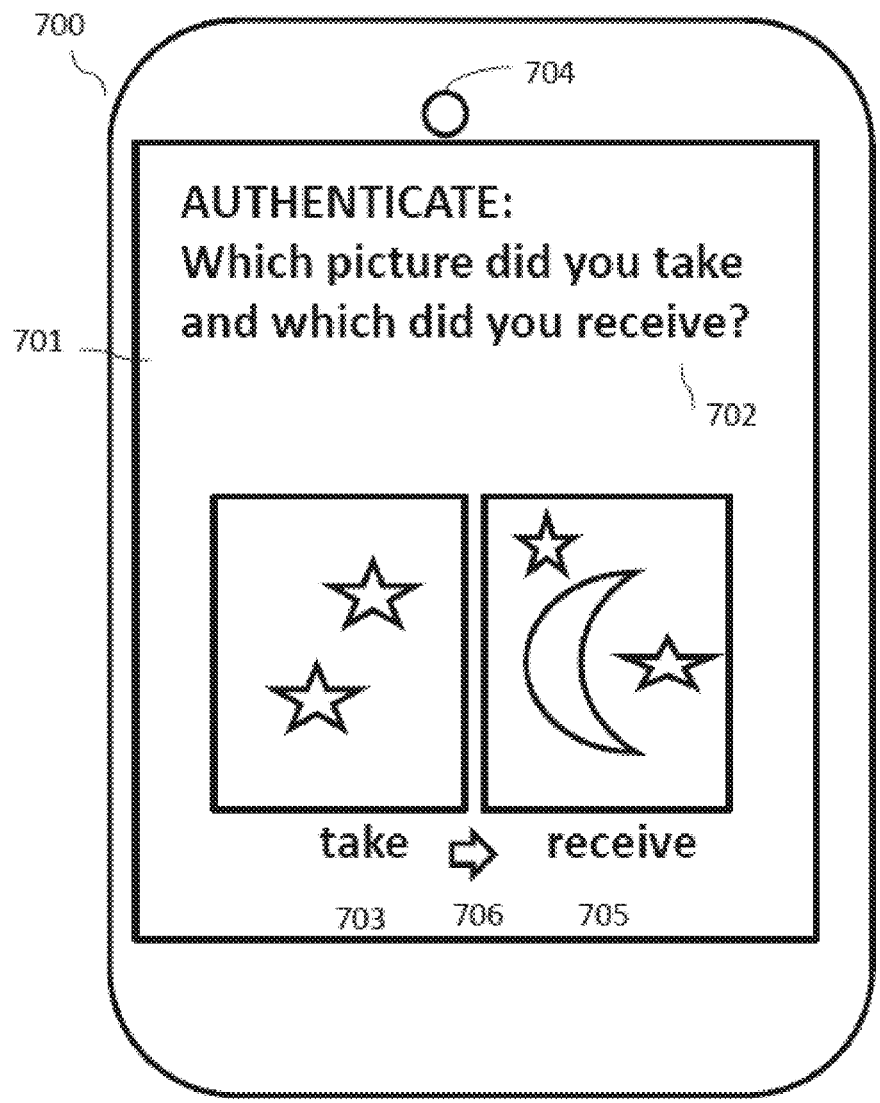
FIG. 1 is an embodiment showing an example of an authentication request on the screen of the device using a history of the interaction of a camera application.

The present disclosure enables a key on the device may be expanded based on a user actuating a region of the touch screen CT/MD. An application on the CT/MD may expand a key on the CT/MD in order to highlight a specific key that is depressed or should be depressed. A key may be expanded in size by a configuration setting on the CT/MD. The full keyboard may be expanded or compressed when a first key is actuated. A second key may be expanded in response to a first key being expanded to facilitate easier actuation of another key. The second key may be an expanded version of the first key and display simultaneously with the first key being displayed. A second key may be expanded if it is a suggested next character.

The present disclosure further allows users to see a variety of compressed or expanded keys based on configuration settings. A user may enter a desired key expansion amount or set a percent expansion of a keyboard.

The present disclosure further allows individuals to use a variety of compressed or expanded keys based on contextual or situational factors. A key may be expanded based on the ambient light detected by a light sensor on the device. In periods of high intensity light, keys may be expanded to take up a greater area of the viewable screen to facilitate easier viewing. A key may also be expanded in response in response to moisture, which may result from perspiration by the individual or humidity.

The present disclosure further allows a user's attention to be directed to certain activities and actions. A key, button, or icon on the CT/MD may flash to attract a user's attention. A key, button, or icon may be highlighted in a first or second color to attract a user's attention and serve as a notification. Notification messages may be flashed on the screen or appear translucent on the screen. A selected key may appear in a first color and the full keyboard may appear in a second color, appear in a color of less intensity or appear translucent.

It is an aspect of the present disclosure to enable the server to influence or control the keyboards, menu items, icons, notifications, and toolbars on the device. The device may be configured to change an icon, keyboard, menu item, or legend in response to a message, data, or other information received from a server.

There may be a hierarchy of icons or macros configured in the device. Icons may be group together into one or more menus. For example, two or three icons may be associated together and placed into a group or menu. This group or menu may be given a new name or icon for actuation. This set may then be grouped with additional icons. Icons may therefore be cascaded in a hierarchy of use on the device. A user may create a new icon using a drawing program. A user may use a photo as an icon. A photo may also be used as a macro function. For example, a first photo of a contact may be placed on the desktop of the device. Actuation of this first photo may call the contact's home number. A second photo of the contact may be placed on the desktop of the device. Actuation of this second photo may call the contact's mobile phone number. These photos may be similarly associated with a hierarchy. Selecting the first photo may run a macro to execute a series of functions. For example, actuation of the first photo may call the home number and if there is no answer may subsequently call the contact's mobile number, send a text message or compose an email.

Authentication:

It is an aspect of the present disclosure to enable the device or a network server to use multiple authentication methods in conjunction with one another to authenticate a user to a device. A user may be required to satisfy a plurality of input and output methods or pass a percent threshold of authentication methods in order to satisfy an authentication requirement. A server may track the number of authentication methods used in order to grant a match between the inputted data and stored values. The server may require authentication responses on multiple devices in order to authenticate a new device or existing device.

The device may also accept voice based input to a macro. The macro function may execute a series of commands. A macro may be spoken to the device. The device in response may convert the spoken audio to text or a data command. The command may execute an application on the device. The application on the device may contact a server to process the request, query another server, query an Internet service, search the Internet, download data from a database, or process a calculation. The server may return the raw data to the device or a synthesized response to the device. The device may accept a spoken command to access a data file on a server. The device may accept a command to control other devices such as a garage door opener.

The escrow server may be a identity management server, authentication server, digital certificate server, public key/private key encryption server, policy server, or other server.

FIG. 1 illustrates the display 701 of a CT/MD 700. The CT/MD 700 presents an authentication request on the screen of the device. The device uses the history of the interaction of a camera application to determine the authentication request 702 to the device. The CT/MD or a server may record in a table, database or other storage means which picture was taken using the camera on the device. Additional meta data about the image taken may be accessed from the image itself which may be encoded with location, GPS coordinates, time of day, device used for image capture, or other information. The CT/MD or server may determine which image is received by storing in a data table meta data about received images. Alternatively, a user may enter in this data in an authentication setting. Alternatively, a server administrator may configure images for authentication. A user may be asked to identify which image was taken 703 using the camera 704 on the device and which image was received 705. The user may indicate a response by spoken words using phrases such as 'image on the left' or by touching an area of the display 706 corresponding to the correct response using a finger or pen.

Figure 2:
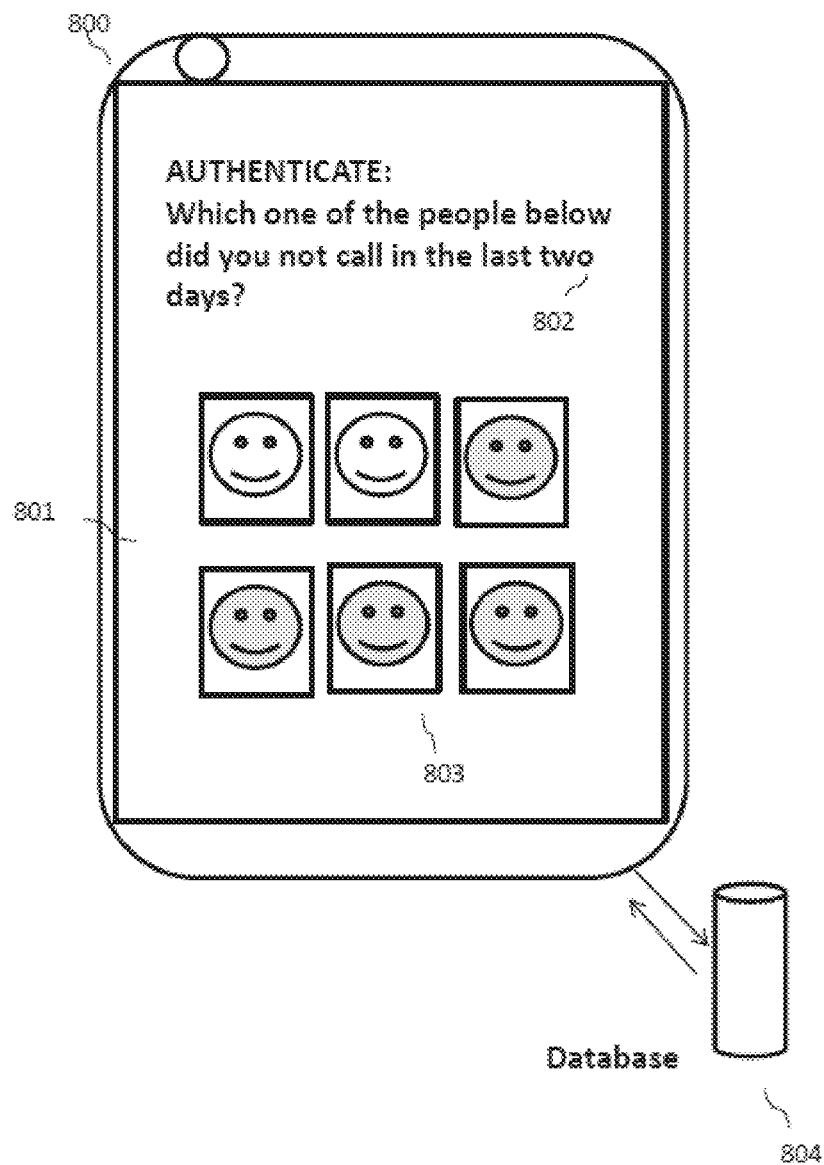
FIG. 2 is an embodiment showing an example of an authentication request on the screen of the device based on the call history.

FIG. 2 illustrates the display 801 of a CT/MD 800. The CT/MD 800 presents an authentication request 803 based on the call history. The call history may be stored in memory on the device or a database 804 located on the device or on the server. The CT/MD or server may present a series of questions to the user seeking access to the device around what calls were made from the device. As an example, a user may be asked which of the last 3 numbers or contacts was called or when a call was initiated to these numbers. This would correspond to an lower security level since the CT/MD or server is providing information to the user. A more stringent security setting may require a user to enter in a phone number called recently, enter the name of a contact recently called, or select a contact listed as a favorite or family member. Alternatively, a user may be asked questions around the frequency with which they call a specific number. This information may be provided in a range (daily, weekly, monthly, rarely) to make it easier for the user to answer the question. The call history may also be linked to a location. For example, a user may be asked to answer where they often call their home number. One of the options may require a user to type in the street name or city or identify a location on a map. A user may often call home from the office but may be unlikely to call home from their home location. These settings may be modified for higher or lower security levels. Questions may further be modified so as to provide information as part of the authentication response or not provide information based on the degree of security required. Similarly, the authentication requests may be a secondary authentication request after a higher or lower security authentication request. Alternatively, the authentication request may for a specific application. A corporate application, email, or credit card related application may necessitate a higher level of security while a media application may not. A phone number itself may be associated with an authentication item. As an example, various contacts may be associated with high or low security levels or various restrictions. Individuals may often need a single device instead of a work and personal device. Correspondingly, the work and personal contacts and numbers may end up on the same device. A user may wish to disable contacts associated work during non business hours. The CT/MD may allow for a user to enter a separate authentication method for certain contacts such as office contacts based on the time of day or other setting.

Figure 3:
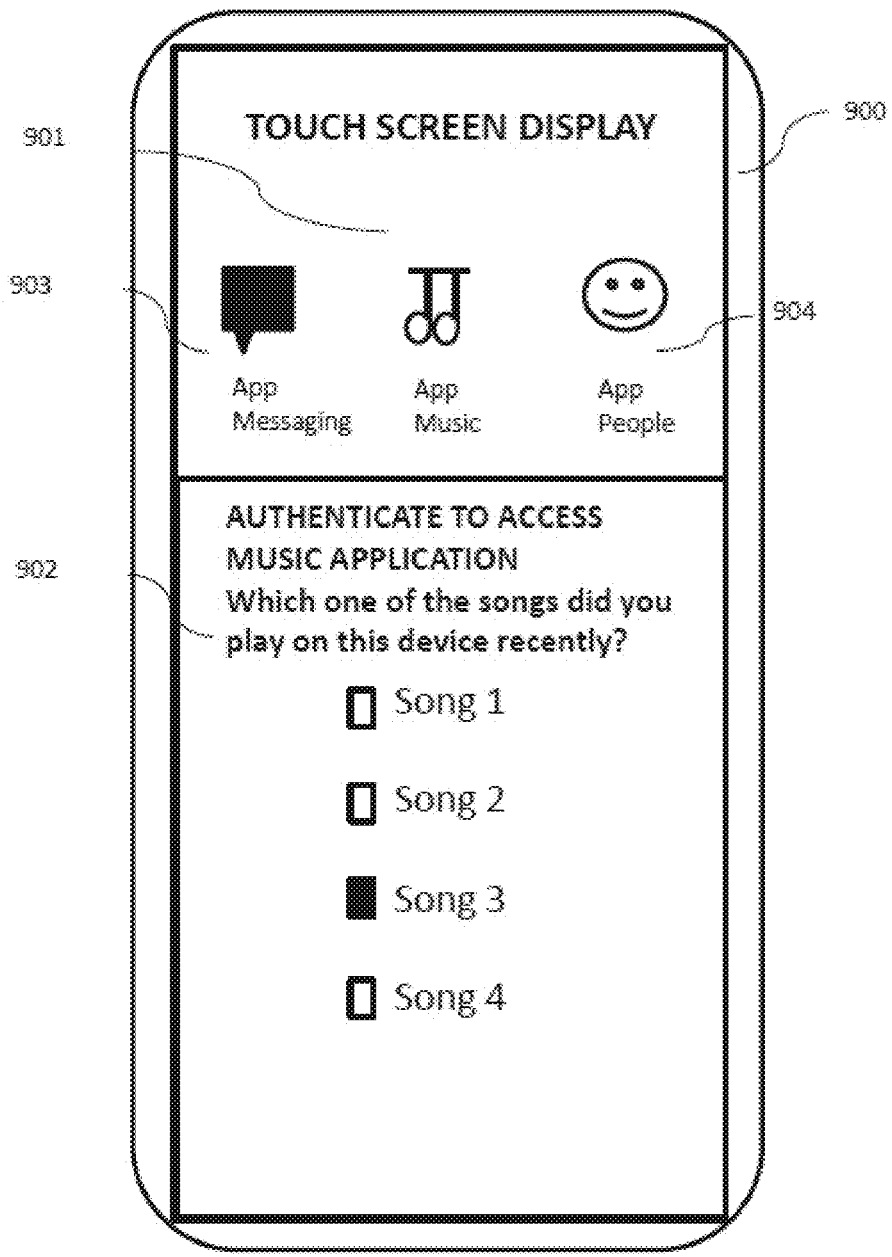
FIG. 3 is an embodiment showing an example of a multi-level authentication request.

FIG. 3 shows a multi-level authentication request on a CT/MD 900. An application may be executed in response to contact or selection from a finger, pen, or other object made with the icon 901 on the display. The authentication request may grant access to both the device 900 and the application 904, only the application 904, or only the device 900. The authentication request may be based on a history item related to the application 904 for which access is requested or for another application such as messaging 903. A history item may include any activity that occurred on the device. As an example, the name, date and time an application was installed on the CT/MD may represent a historical item. Alternatively, the last website accessed on the browser may be used as a history item.

Figure 4:
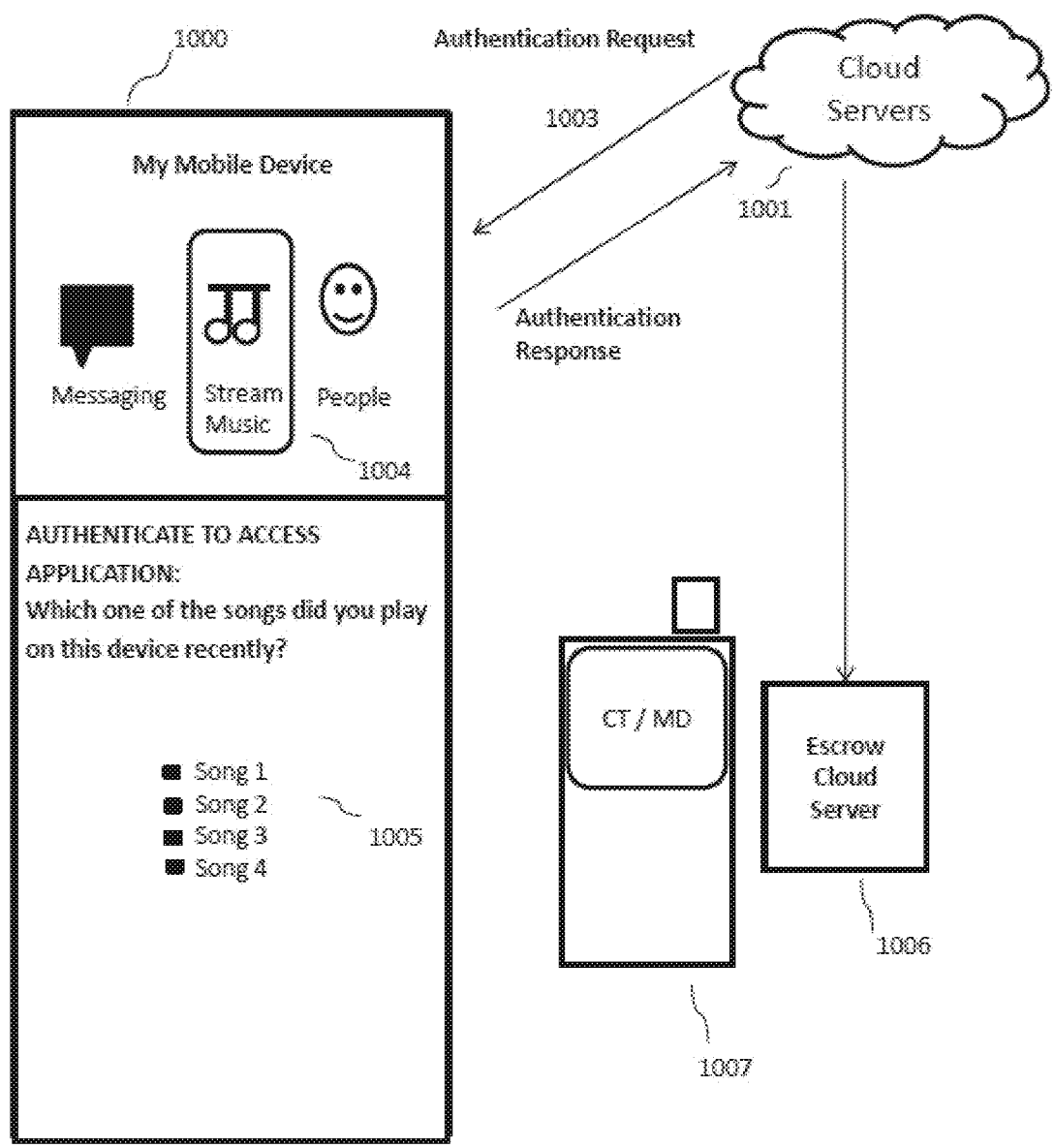
FIG. 4 is an embodiment showing an example of an authentication request in conjunction with a CT/MD and server.

FIG. 4 illustrates an authentication request in conjunction with a CT/MD 1000 and server 1001. The server may request a type of authentication request of the device. An application that requests a streaming music service from a server may be required to satisfy an authentication request 1003 defined by the server 1001. The streaming music service may be initiated by making contact with the icon 1004. The device may present the authentication request in a textual or graphical form 1005 on the CT/MD 1000. The authentication request 1003 may require the use of historical usage data of device 1000, server 1001 or escrow server 1006. The authentication request 1003 may contain information that requires a user to enter information on the CT/MD 1000 to confirm physical possession of the CT/MD 1000. The server 1001 or escrow server 1006 may define the number of authentication requests required. The authentication request may further require a plurality of authentication responses across a second electronic device 1007.

Figure 5:
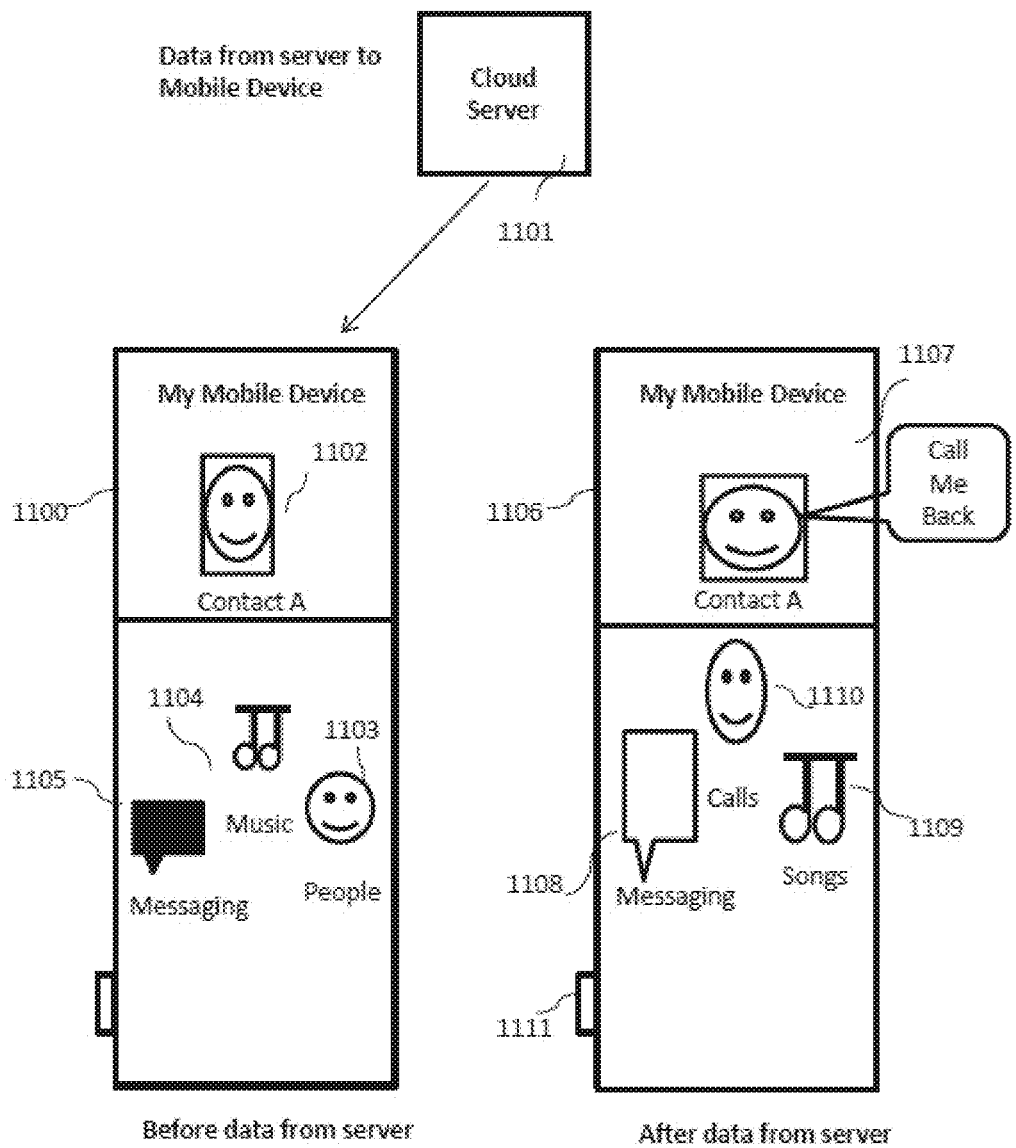
FIG. 5 is an embodiment showing an example of sending data to the CT/MD and receiving data from the CT/MD.

FIG. 5 shows the server 1101 sending data to the CT/MD 1100 and receiving data from the CT/MD 1100. The icons 1102, 1103, 1104, or macros 1105 may be configured standalone or in conjunction with the server 1101. These icons may be modified in real time based on data from the device or server. The macros, icons, legends or other items may change in response to data from the server 1101. After receipt of the data 1106, the CT/MD 1100 may show different icons 1107 or different macros 1108 with pictures, numbers, shapes, highlights, or blinking indicators. Names of icons 1101 may also change. A physical key 1111 may also be redefined based on a configuration setting on the device 1106 or on the server 1101.

Figure 6:
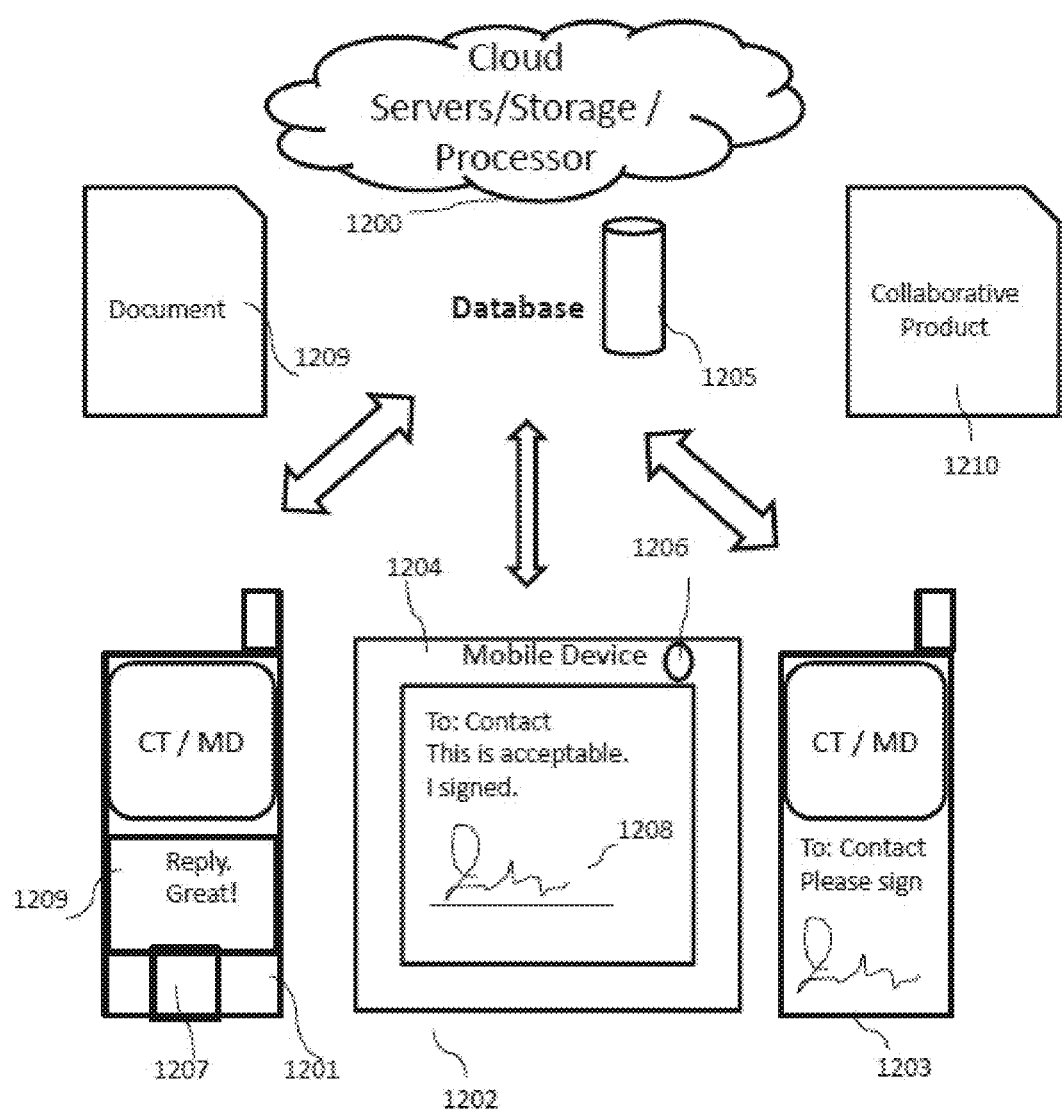
FIG. 6 is an embodiment illustrating an example of collaboration across multiple devices using text, signature, and graphics.

FIG. 6 illustrates collaboration across multiple devices using text, signature, and graphics. The server 1200 facilitates the transfer of data between multiple CT/MDs 1201, 1202, and 1203. The server 1200 receives a message 1204 from a device 1202. The server sends the message 1204 to another device 1203. The user may respond to the message on the same device 1203 or another device 1201 where the response is sent first to the server 1200 and then to other CT/MDs 1202 and 1203. The server 1200 stores the data for the messages in the database 1205. The message content may also include video or images captured using the camera 1206.

Using the camera, the participants may engage in peer to peer video conferencing or server mediated video conferencing. A fingerprint image may be acquired by a fingerprint scanner 1207 located on the device or by a camera located on the device to authenticate a person or new device. The CT/MD or server may store digitized samples of finger print data in a look up table for a person. The CT/MD may also acquire an ink based image of a fingerprint using the camera and process the image for fingerprint recognition either on the CT/MD or on a server. A new device may be synchronized with the server and download the shared data after providing a positive response to an authentication query.

The device may be further configured with the ability for a user on a first device to send a signature request for a document 1209 to a contact in the contact list of the device. The document 1209 may also include purchase or transaction requests. For example, a purchase order may need to be electronically signed. The request may be sent to a specific device using, e.g., a text message. The document 1209 may also be sent to a specific email address.

A user may set a hierarchy of signatures required to complete the approval of a document. For example, the document may be first required to be signed by a first individual. A second or third individual may be required next. Lastly, a fourth individual may be required to complete final approval of the document 1209.

A user may define a time period under which a signature 1208 should be completed.

The document 1209 to be signed electronically and supporting documents may be stored on the device or on a server. A request including an Internet accessible link to the document 1209 may be sent from a user on a first device to other users on other devices. A user on a second device may download the document 1209 and select an area of the document 1209 to annotate or sign. The document 1209 may be annotated with markers to identify areas for the signature. The document 1209 may be annotated with notes. The CT/MD, Server, or other electronic device may collect the responses, process the signatures including for handwriting recognition, and notify the other devices when the process is complete. The finalized signed document may not be published to the other devices until all the signatures are collected.

The signature may come from the user actuating with the screen using strokes of the finger or a stylus on a specified region for a signature.

A document may require a second authentication method in addition to a signature 1208. The second authentication method may include a picture of the individual obtained by a camera 1206 on the device, a fingerprint reading 1207, a GPS location, a phone call to an online system, a response to a text message with a password or identifier, an email to a specific address, or another method.

The users may be notified using email, text message, voice message, or another method when all the signatures are complete.

The CT/MD with the server can enable a plurality of functions including document viewing, sharing, annotating, modifying, editing the text document, graphics, image, video, audio, sound and data and or combinations thereof as a collaborative product 1210. The collaborative product 1210 between users may be inclusive of text, voice, sound, audio, image, video, graphics and data; As an example, a collaborative product may include all the pictures taken on a given day and further annotated with comments on each picture.

The collaborative product 1210 may be accessed in a contemporaneous manner and/or at a later time by one or more users. The collaborative product 1210 may be enabled for maintaining revision control by the central server or a designated intelligent keyboard user. The collaborative product 1210 may be enabled for time stamping the access and actions of one or more parties to the collaborative work product in progress. The server may maintain electronically valid signatures images and authentication files for each user that is party to the transaction or signature event.

The CT/MD may feature a signature window and enable witnesses to corroborate the event. Certain witnesses that have obtained appropriate approvals may notarize the document electronically. Other witnesses may have associated with them various credibility ratings. A witness may also sign as to observing the signature in either the physical presence or by watching the signature in real time in an online fashion. The witness may also be recorded using the camera or video camera on the CT/MD. As an example, the video camera on the CT/MD may record or stream the signing event to another CT/MD or server. The other CT/MD or server may store the signing event for future playback, auditing, or other purposes. Alternatively, the camera on the CT/MD may take snapshots while the signature event is taking place. An audio recorder integrated into the CT/MD may record sounds that are taking place at this time. The CT/MD may further record the GPS location of the signature event. The signature and associated meta-data related to the event may be archived to the signature document and stored locally on the CT/MD or on the server.

The collaboration event may further be enabled to record negotiation and requests by one or more parties. The collaboration product 1210 may be marked as pending or as a final version. Parties may state by selecting a touch box, an accept button, or other marker to indicate agreement.

The parties privy to the collaboration event may be required to agree to the event at a specified time, in real time or simultaneously.

The server may compare the signatures, signature images, signature strokes, time to sign, signature movement across the touch screen, to stored samples located on the device or a server. The CT/MD or server may perform handwriting recognition using a software program.

There may exist a plurality of servers enabled to stored one or more samples of the data. A server may function as an escrow server whereby the server holds authentication information or collaboration information for a specified time or rule.

The authentication system may require a plurality of authentication methods simultaneously, sequentially, temporally spaced, or geographically spaced using GPS information. One authentication method may require a voice reading while a second authentication method may require a password being entered on the device. A server may require authentication to a service by requiring a user to enter a password on the CT/MD and a code delivered by the server to the CT/MD. The server may also require authentication by requiring a user to enter a password on the CT/MD and then a password obtained from the CT/MD while the password is entered. An image may compared against a stored sample on the device or on the server. The image may also include a retinal scan that is compared against a stored sample.

The server or CT/MD may also require and obtain GPS location information for the phone during an authentication event. The server may correlate a plurality of authentication information to determine whether the collaborator is in proximity to another collaborator. The server may use an IP address to determine location. The server may also store and correlate IP addresses for authentication purposes.

Figure 7:
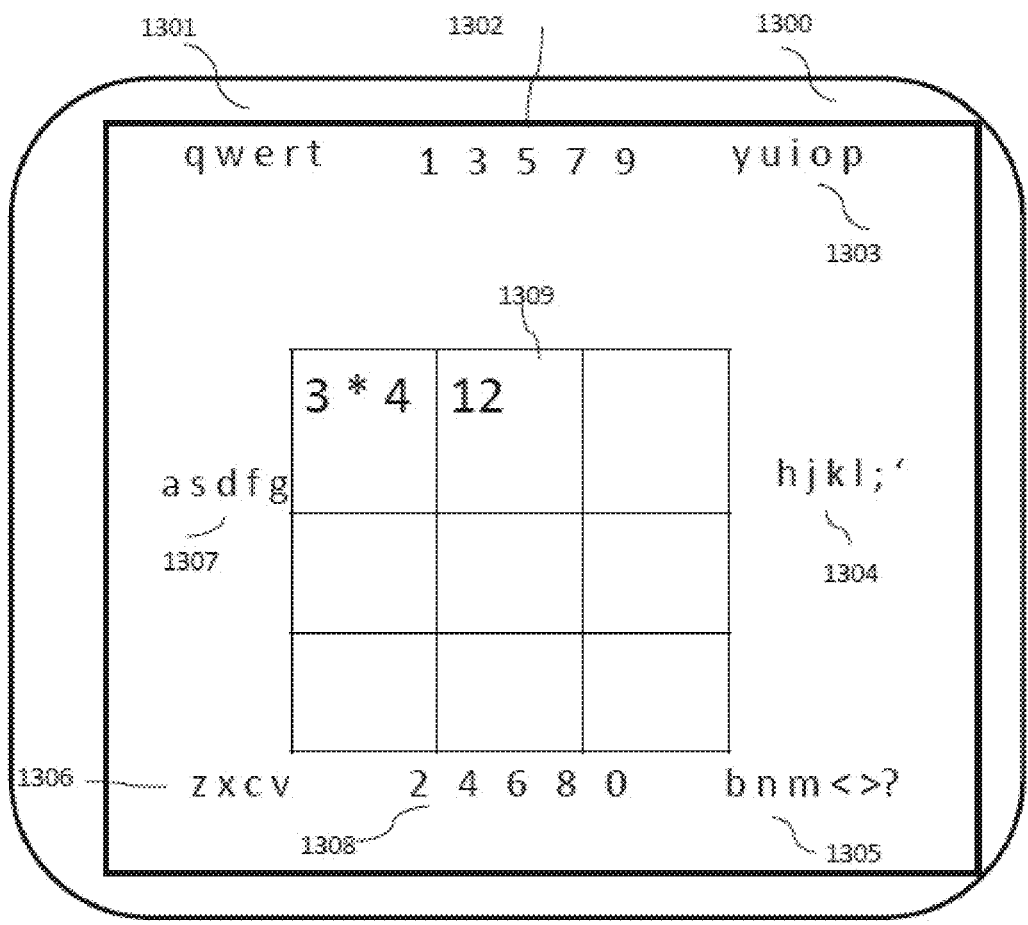
FIG. 7 is an embodiment showing an example of CT/MD with multiple keyboards spaced at different positions on a touch screen display.

FIG. 7 illustrates a CT/MD 1300 with multiple keyboards 1301, 1302, 1303, 1304, 1305, 1306, 1307, 1308 spaced at different positions on a touch screen display. A user may define the ideal spacing in a configuration file. Alternatively the CT/MD or server may contain ideal spacing information. An individual's hand size and finger size may be used to create an ideal spacing of the keyboard. The finger size may be measured during a calibration process where the user places their fingers on the touch screen and the CT/MD determines the points of contact. Alternatively, a user may describe their hand type such as small, medium, or large and the system may use the associated keyboard spacing. The CT/MD may also download various keyboard spacing from a server. This spacing allows for greater vertical separation between the rows of a keypad. A horizontal separation may also be enabled or different combinations of split keyboards groups of keys, or specific keys may be configured. Keyboards 1302 and 1308 feature greater horizontal and vertical separation than a full numeric keypad organized as a row. Similarly macros or icons can be split across different areas. The location of the keyboards may be configurable by a user. The keyboards may allow for easy access to keys to prevent inadvertent selection of the wrong character. A first keyboard such as the numeric keyboard 1302 may be located at the top of the display and may appear or disappear based on the application the CT/MD. The application 1309 as shown is a spreadsheet application where character entry and numeric entry may both be required by a user.

The keys in the keyboard typically could be LCDs for displaying the respective legends, and desirably are touch sensitive.

The foregoing descriptions of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed is:

1. A method including a mobile device comprising:
capturing, by the mobile device, at least one gesture performed in the air;
identifying the at least one gesture;
linking the at least one gesture to a command for the mobile device to perform;
providing a customized input entry upon viewing a message with a contact, the customized input entry comprising of one or more suggested frequently used phrases specific to a location of the mobile device;
providing a plurality of keyboards, wherein at least one of the plurality of keyboards is configurable to be in a fixed position and at least one of the plurality of keyboards is configurable to be in a movable position; and
wherein the mobile device is enabled to accept a user request to drag and drop at least one of the plurality of keyboards to a desired position.

2. The method of claim 1, wherein the at least one gesture is performed by a physical contact of a finger of the user with a touch screen display of the mobile device.

3. The method of claim 2, wherein the at least one gesture includes moving a current window in a foreground to a background position and a background window to the foreground position.

4. The method of claim 1, a plurality of shapes are enabled to be configured by the user and coupled to one or more actions.

5. The method of 1, wherein the at least one gesture comprises of a left swipe motion, and wherein said at least one gesture is configured to shift a window to be displayed out of a user view.

6. The method of claim 5, wherein the at least one gesture comprises further of a right swipe motion and wherein said right swipe motion is configured to position a window to be displayed in a predefined portion of the right side of a view.

7. The method of claim 6, wherein a plurality of windows are displayed at the same time.

8. The method of claim 7, wherein the plurality of windows are displayed in roundtable like format.

9. A non-transitory computer readable medium that when executed by a processor of a mobile device is configured to:
capture by the mobile device at least one gesture;
identify the at least one gesture;
link the at least one gesture to at least one instruction for the mobile device to perform;
provide a suggested input entry upon viewing a message with a contact, the suggested input entry comprising of one or more frequently used phrases specific to the a location of the mobile device;
wherein a first portion of a keyboard is configured to be displayed in a first position and a second portion of the keyboard is configured to displayed in a second position simultaneously on the mobile device;
a plurality of keyboards, wherein at least one of the plurality of keyboards is configurable to be in a fixed and at least one of the plurality of keyboards is configurable to be in a movable position; and
wherein a user is enabled to drag and drop at least one of the plurality of keyboards to a desired position.

10. The non-transitory computer readable medium of claim 9, wherein the at least one gesture comprises of a left swipe motion and wherein said at least one gesture is configured to shift at least one of the plurality of windows of the display to the left.

11. The non-transitory computer readable medium of claim 10, wherein the at least one gesture further comprises of a right swipe motion such that the right swipe motion is configured to position a display of at least one of the plurality of windows to a right side.

12. The non-transitory computer readable medium of claim 11, wherein at least two or more of the plurality of windows are displayed at the same time.

13. The non-transitory computer readable medium of claim 12, wherein a plurality of windows are displayed in roundtable like format.

14. The non-transitory computer readable medium of claim 12, wherein the gesture comprises of physical contact with a display of the mobile device.

15. The non-transitory computer readable medium of claim 12, wherein the at least one of the plurality of keyboards is configurable to be in a fixed or movable position is a floating keyboard.

* * * * *